United States Patent
Baek

(10) Patent No.: US 9,398,431 B2
(45) Date of Patent: Jul. 19, 2016

(54) METHOD FOR RUNNING APPLICATIONS USING MOBILE DEVICE AND PLAYBACK APPARATUS SUPPORTING BD-J SPECIFICATION

(75) Inventor: Wonjang Baek, Seongnam-si (KR)

(73) Assignee: SK PLANET CO., LTD., Seoul (KR)

( * ) Notice: Subject to any disclaimer, the term of this patent is extended or adjusted under 35 U.S.C. 154(b) by 382 days.

(21) Appl. No.: 12/819,272

(22) Filed: Jun. 21, 2010

(65) Prior Publication Data

US 2010/0323760 A1   Dec. 23, 2010

(30) Foreign Application Priority Data

Jun. 22, 2009   (KR) .................. 10-2009-0055449

(51) Int. Cl.
| | |
|---|---|
| *H04B 1/38* | (2015.01) |
| *H04W 4/20* | (2009.01) |
| *G11B 27/10* | (2006.01) |
| *G06F 9/54* | (2006.01) |
| *H04W 4/02* | (2009.01) |

(52) U.S. Cl.
CPC .  *H04W 4/20* (2013.01); *G06F 9/54* (2013.01); *G11B 27/105* (2013.01); *H04W 4/02* (2013.01)

(58) Field of Classification Search
CPC .......... H04M 1/7253; H04M 1/72533; H04M 1/72558; H04M 1/72522; H04M 1/72527; H04M 2250/64; H04M 1/6066; H04M 1/72561; H04M 1/72563; H04M 2250/00; H04M 2250/02; H04M 2250/04; H04M 2250/06; H04M 2250/20; H04M 2250/52

USPC ........ 455/556.1–559, 151.1–153.2, 344–346, 455/3.06, 66.1; 340/539.1–539.19; 345/156–184; 715/716–718

See application file for complete search history.

(56) References Cited

U.S. PATENT DOCUMENTS

| | | | |
|---|---|---|---|
| 2005/0215283 A1* | 9/2005 | Camp, Jr. ................... | 455/556.2 |
| 2006/0098940 A1 | 5/2006 | Seo et al. ......................... | 386/46 |
| 2007/0186286 A1 | 8/2007 | Shim et al. ....................... | 726/26 |
| 2007/0224937 A1* | 9/2007 | Jung et al. ..................... | 455/41.2 |
| 2008/0022003 A1* | 1/2008 | Alve ............................... | 709/229 |
| 2008/0141327 A1 | 6/2008 | Oh et al. ......................... | 725/131 |
| 2008/0207115 A1* | 8/2008 | Lee et al. ...................... | 455/3.06 |
| 2009/0049092 A1* | 2/2009 | Capio et al. ................. | 707/104.1 |
| 2009/0150553 A1* | 6/2009 | Collart et al. ................. | 709/229 |
| 2009/0180398 A1* | 7/2009 | Lejeune ......................... | 370/254 |
| 2010/0201567 A1* | 8/2010 | Lydon ..................... | H04W 8/24 342/357.22 |

OTHER PUBLICATIONS

Notice of Allowance dated May 31, 2011, issued by Korean Patent Office in corresponding application KR 10-2009-0055449.

* cited by examiner

*Primary Examiner* — San Htun
*Assistant Examiner* — Erica Navar
(74) *Attorney, Agent, or Firm* — Stein IP, LLC

(57) ABSTRACT

A method for running applications using a mobile device and a playback apparatus supporting a BD-J specification is disclosed. In accordance with the present invention, a function that cannot be provided by the playback apparatus supporting the BD-J specification is provided by the mobile device, thereby preventing the lack of resources and the rise of suppressing the manufacturing costs of the playback apparatus.

3 Claims, 6 Drawing Sheets

METHOD FOR RUNNING APPLICATIONS USING MOBILE DEVICE AND PLAYBACK APPARATUS SUPPORTING BD-J SPECIFICATION

This application claims the benefit of Korean Patent Application No. 10-2009-0055449 filed on Jun. 22, 2009, which is hereby incorporated for reference.

BACKGROUND OF THE INVENTION

1. Field of the Invention

The present invention relates to a method for running applications using a mobile device and a playback apparatus supporting a BD-J specification, and more particularly to a method for running applications using a mobile device and a playback apparatus supporting a BD-J specification wherein a function that cannot be provided by the playback apparatus supporting the BD-J specification is provided by the mobile device.

2. Description of the Related Art

A Blu-ray specification is designed by Blu-ray Disc Association ("BDA"), whose members include Sony, Hitachi and Sharp. The Blu-ray specification includes a specification of a Blu-ray disk which is an optical disc that may be read and recorded using a blue laser.

While a diameter and a thickness of the Blu-ray disk, which are 12 cm and 1.2 mm, respectively, are same as those of conventional CD (Compact Disc) and DVD (Digital Versatile Disc), a storage capacity thereof is larger than those of the conventional CD and DVD.

Because the blue laser having a wavelength of 405 nm is used for reading the Blu-ray disk instead of a red laser having a wavelength of 650 nm used for reading the DVD, more data can be stored in the Blu-ray disk than the DVD.

Specifically, a single layer Blu-ray disk is capable of storing up to 25 GB of a data and a dual layer Blu-ray disk is capable of storing up to 50 GB of the data. This means that the Blu-ray disk can store five times more data than the DVD.

Moreover, a quad layer Blu-ray disk and an octal layer Blu-ray disk can store up to 100 GB and 200 GB, respectively.

The Blu-ray disk supports a video compression codec of MPEG-2 which is widely used in the DVD. Moreover, BDA standard specification requires the Blu-ray disk to use H.264/AVC or VC-1 as the video compression codec which provides improved compression ratio compared to MPEG-2.

In addition, the Blu-ray disk supports audio formats such as Dolby Digital Plus, Dolby TrueHD and DTS-HD Master Audio as well as PCM (Pulse-code modulation), Dolby Digital and DTS.

A Blu-ray player plays audio/video data stored in the Blu-ray disk. A Blu-ray player supporting a BD-J specification supports an interactive service based on JAVA. Moreover, the Blu-ray player supporting the BD-J specification supports a network connectivity, a PIP (Picture-In-Picture) and a connection to a local storage.

Therefore, the Blu-ray player supporting a BD-J specification may play the audio/video data stored in a remote storage.

Hereinafter, "a playback apparatus supporting the BD-J specification" includes the Blu-ray player supporting the BD-J specification or an apparatus using a middleware supporting the BD-J specification such as a TV, a set-top box, a PMP (Portable Multimedia Player), a video game console, a PC (Personal Computer) and a PVR (Personal Video Recorder).

The playback apparatus supporting the BD-J specification is capable of executing various applications. For instance, various applications such as a word processor application, a note-pad application, an application including a URL (Uniform Resource Locator) and an image capture application may be executed in the playback apparatus supporting the BD-J specification.

However, the playback apparatus supporting the BD-J specification does not include a user input means, a web browsing means and an image input means. Therefore, the various applications are executed in limited manner in the playback apparatus supporting the BD-J specification.

For example, when the word processor application is executed in the playback apparatus supporting the BD-J specification, the user may only view a document through a document viewer provided by the word processor application and may not edit the document through the word processor application because the playback apparatus supporting the BD-J specification does not include the user input means.

For another example, when the application including the URL is executed in the playback apparatus supporting the BD-J specification, the user cannot use the playback apparatus supporting the BD-J specification to connect to a web page because the playback apparatus supporting the BD-J specification does not support a web browsing.

When a function not supported by the playback apparatus supporting the BD-J specification is embodied additionally in order to overcome above limitations, a resource of the playback apparatus supporting the BD-J specification may be taken up and a manufacturing cost thereof is increased disadvantageously.

SUMMARY OF THE INVENTION

It is an object of the present invention to provide a method for running applications using a mobile device and a playback apparatus supporting a BD-J specification wherein a function that cannot be provided by the playback apparatus supporting the BD-J specification is provided by the mobile device.

In order to achieve above-described object of the present invention, there is provided a method for running applications using a mobile device and a playback apparatus, the method comprising steps of: (a) executing a main application in the playback apparatus; (b) transmitting to the mobile device an auxiliary information required for running the main application; (c) executing an auxiliary application associated with the auxiliary information in the mobile device; and (d) processing a response information obtained by executing the auxiliary application.

Preferably, the auxiliary information includes an URL (Uniform Resource Locator), and wherein the step (c) comprises executing the auxiliary application including a web browser to connect to the URL.

Preferably, the step (d) comprises displaying a web page associated with the URL on a screen of the mobile device.

Preferably, wherein the auxiliary information includes a request for a location information, and wherein the step (c) comprises executing the auxiliary application including a GPS (Global Positioning System) application to acquire the location information.

Preferably, the step (d) comprises transmitting the response information including the location information to the playback apparatus.

Preferably, the auxiliary information includes a request for a user input, and wherein the step (c) comprises executing the auxiliary application including a keyboard application to receive the user input.

Preferably, the step (d) comprises transmitting the response information including the user input to the playback apparatus.

Preferably, the auxiliary information includes a request for an image information, and wherein the step (c) comprises executing the auxiliary application including an image generation application to generate the image information.

Preferably, the step (d) comprises transmitting the response information including the image information to the playback apparatus.

The method in accordance with the present invention may further comprise (e) running the main application based on the response information.

Preferably, the playback apparatus supports a BD-J (Blu-ray Disc Java) specification.

DETAILED DESCRIPTION OF THE INVENTION

A method for running applications using a mobile device and a playback apparatus supporting a BD-J specification in accordance with the present invention will be described in detail with reference to accompanied drawing.

Hereinafter, the mobile device may include, but is not limited to, a portable communication terminal such as an iPhone, a PDA (personal digital assistant), a laptop computer and PMP (Portable Media Player). Moreover, the playback apparatus supporting the BD-J specification may include, but is not limited to, a Blu-ray player supporting the BD-J specification and a television, a set-top box and a game machine with a middleware supporting the BD-J specification.

Figure 1:
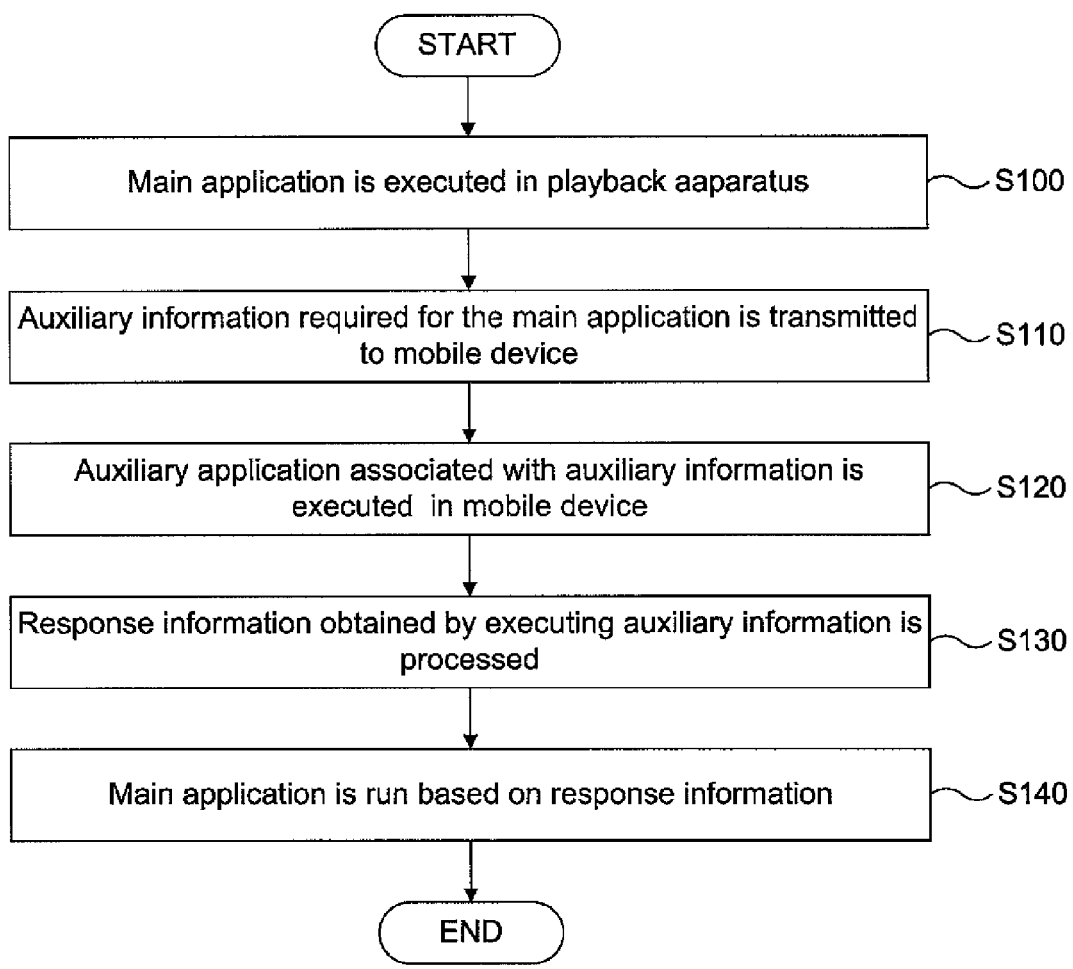
FIG. 1 is a flow diagram illustrating a method for running applications using a mobile device and a playback apparatus supporting a BD-J specification in accordance with the present invention.

FIG. 1 is a flow diagram illustrating a method for running applications using a mobile device and a playback apparatus supporting a BD-J specification in accordance with the present invention.

Referring to FIG. 1, a main application is executed in the playback apparatus (S100). The main application may be stored in the playback apparatus or received through a network. The main application may include, but is not limited to, a word processor application, a note-pad application or an image capture application.

Thereafter, an auxiliary information required for running the main application which is executed in the playback apparatus is transmitted to the mobile device (S110).

The auxiliary information includes various informations required for running the main application. In one embodiment, when the main application is the word processor application, the auxiliary information may include a request for a user input. In another embodiment, when the main application is the image capture application, the auxiliary information may include a request for an image information.

Thereafter, an auxiliary application associated with the auxiliary information is executed in the mobile device (S120). In one embodiment, when the main application is the word processor application, the auxiliary application may include a keyboard application for receiving the user input. In another embodiment, when the main application is the image capture application, the auxiliary application may include an image generating application for generating the image information.

Thereafter, a response information obtained by executing the auxiliary application is processed (S130). In one embodiment, when the auxiliary application is the keyboard application, the response information including the user input received through the keyboard application is transmitted to the playback apparatus. In another embodiment, when the auxiliary application is the image generating application, the response information including the image information generated by the image generating application is transmitted to the playback apparatus.

Thereafter, the main application is run based on the response information received from the playback apparatus (S140). In one embodiment, when the main application is the word processor application, the user input included in the response information received from the mobile device is relayed to the word processor application, and displayed on a screen of a display apparatus connected to the playback apparatus. In another embodiment, when the main application is the image capture application, the image information included in the response information received from the mobile device is relayed to the image capture application to be captured as an image.

Various embodiments in accordance with the present invention will now be described in detail with reference to the accompanied drawings.

[First Embodiment]

The first embodiment exemplifies a method in accordance with the present invention wherein a URL (Uniform Resource Locator) is demanded by the main application when running the main application.

Generally, the playback apparatus is not capable of providing a web browsing via a web browser. Therefore, the user can not connect to a web page during an execution of the main application even if a link including a URL of the web page is displayed on the screen. In accordance with the present invention, the user may use the mobile device in his/her possession to connect to the web page. A detailed description will be given hereinafter.

Figure 2:
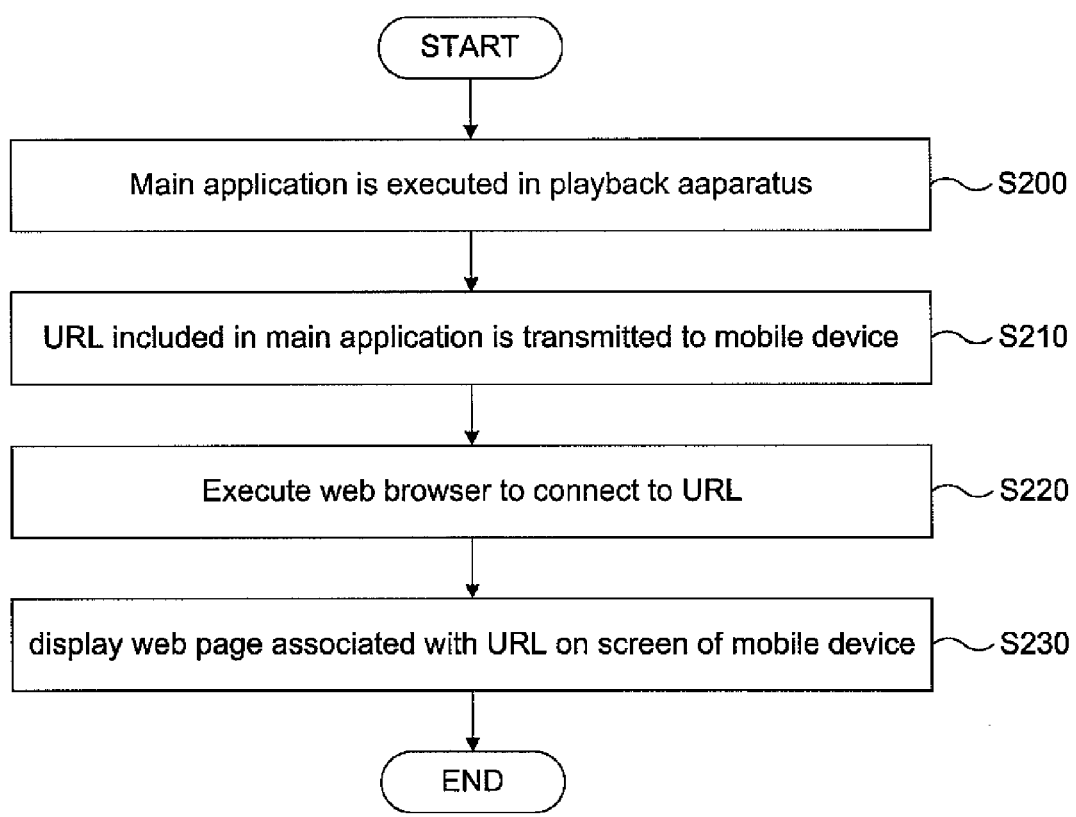
FIG. 2 is a flow diagram illustrating a method for running applications when the auxiliary information includes the URL in accordance with the present invention.

FIG. 2 is a flow diagram illustrating the method for running applications when the auxiliary information includes the URL in accordance with the present invention.

Referring to FIG. 2, the main application is executed in the playback apparatus (S200). The main application may be a disk playback application playing a blu-ray disk.

The link including the URL of the web page may be displayed on the screen during the execution of the disk playback application. For instance, a link for a detailed information on cast of a movie may be displayed while the user navigates through contents stored in the blu-ray disk.

Thereafter, the URL included in the main application, i.e., the auxiliary information is transmitted to the mobile device (S210).

Thereafter, the web browser is executed in the mobile device and connects to the URL (S220). The playback apparatus is not equipped the web browser. The user cannot browse through the web page because the playback apparatus is not capable of providing the web browsing. However, the mobile device equipped with the web browser may connect to the URL received from the playback apparatus to download a content associated with the URL.

Thereafter, the web page associated with the URL is displayed on the screen of the mobile device (S230).

[Second Embodiment]

The second embodiment exemplifies a method in accordance with the present invention wherein a location information is demanded during the process of executing the main application.

Generally, the playback apparatus is not capable of providing a GPS (Global Positioning System) function which provides the location information. Therefore, the playback apparatus may not execute the main application properly when the main application requires the location information. In accordance with the present invention, when the main application requires the location info nation, the playback apparatus may receive the location information from the mobile device to properly execute the main application. A detailed description is given below.

Figure 3:
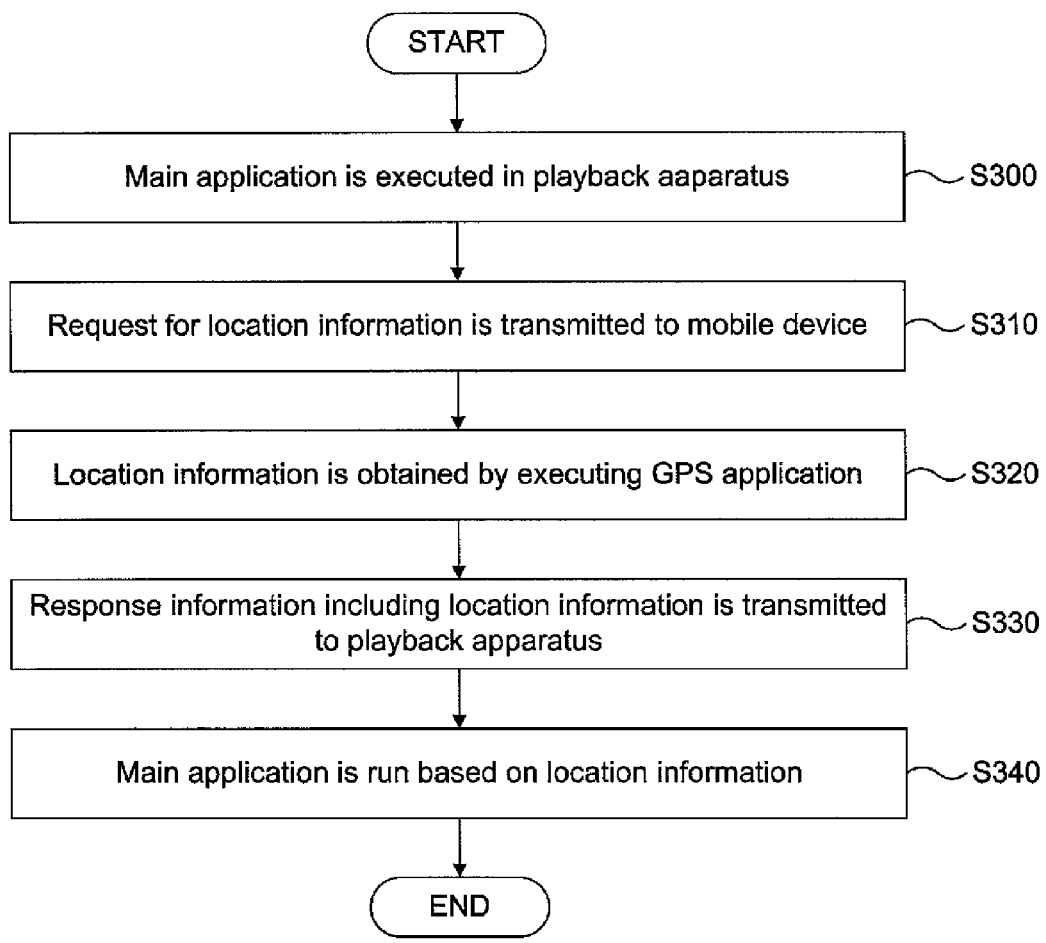
FIG. 3 is a flow diagram illustrating a method for running applications when the auxiliary information includes a request for the location information in accordance with the present invention.

FIG. 3 is a flow diagram illustrating the method for running applications when the auxiliary information includes a request for the location information in accordance with the present invention.

Referring to FIG. 3, the main application is executed in the playback apparatus (S300). The main application may be a map service application requiring the location information.

When the location information is required during the execution of the map service application, the auxiliary information, generated by the playback apparatus, including the request for the map service application is transmitted to the mobile device (S310).

Thereafter, the location information is acquired from a GPS module connected to the mobile device by executing a GPS application in the mobile device (S320).

Thereafter, the response information, generated by the mobile device, including the location information which is obtained from the GPS module is transmitted to the playback apparatus (S330).

Thereafter, the location information included in the response information received from the playback apparatus is relayed to the main application (S340). The location information may be displayed on the screen of a display apparatus connected to the playback apparatus when necessary.

While the main application requiring the location information is exemplified in the second embodiment, the main application may require other informations. For instance, the main application may require value measured by a sensor that is equipped by the mobile device, but not equipped by the playback apparatus such as an acceleration sensor and a compass. When the main application requires the value, the mobile device transmits the response information including the value in response to the request from the playback apparatus.

[Third Embodiment]

The third embodiment exemplifies a method in accordance with the present invention wherein the user input is demanded during the process of executing the main application.

Generally, the playback apparatus is not capable of providing a keyboard function for receiving the user input. Therefore, the playback apparatus may not execute the main application properly when the main application requires the user input. In accordance with the present invention, when the main application requires the user input, the playback apparatus may receive the user input from the mobile device to properly execute the main application. A detailed description is given below.

Figure 4:
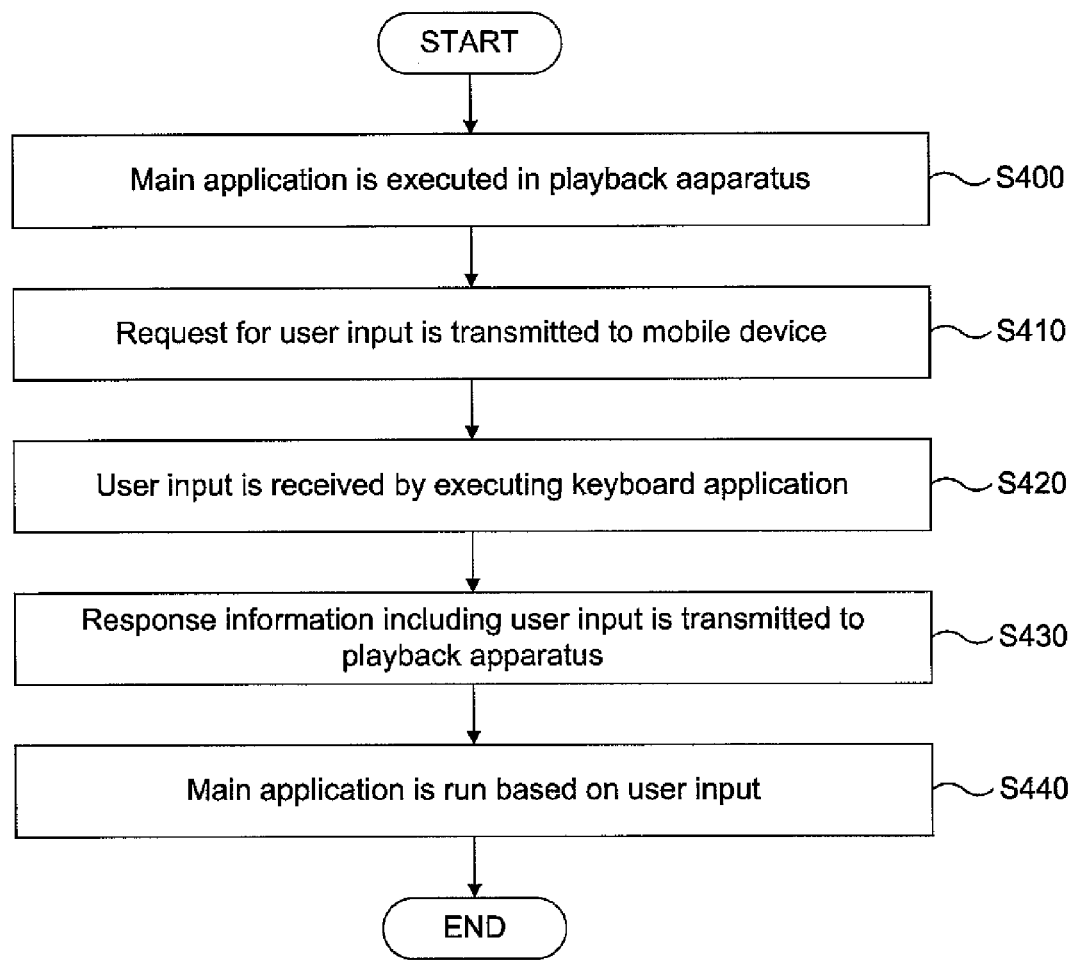
FIG. 4 is a flow diagram illustrating a method for running applications when the auxiliary information includes a request for the user input in accordance with the present invention.

FIG. 4 is a flow diagram illustrating the method for running applications when the auxiliary information includes a request for the user input in accordance with the present invention.

Referring to FIG. 4, the main application is executed in the playback apparatus (S400). The main application may be a word processor application, a note-pad application, an e-mail application or a character input application requiring the user input such as a keyboard input.

When the user input is required during the execution of the word processor application or the note-pad application, the auxiliary information, generated by the playback apparatus, including the request for the user input is transmitted to the mobile device (S410).

Thereafter, the user input is received by executing the keyboard application in the mobile device (S420). For instance, when the mobile device is equipped with a touch screen, the user input is received by executing a touch screen application.

Thereafter, the response information, generated by the mobile device, including the user input obtained by the keyboard application is transmitted to the playback apparatus (S430).

Thereafter, the user input included in the response information which is received from the mobile device is relayed to the main application (S440). The user input may be displayed on the screen of the display apparatus connected to the playback apparatus when necessary.

[Fourth Embodiment]

The fourth embodiment exemplifies a method in accordance with the present invention wherein the image information is demanded during the process of executing the main application.

Generally, the playback apparatus is not capable of providing a camera function for obtaining the image information. Therefore, the playback apparatus may not execute the main application properly when the main application requires the image information. In accordance with the present invention, when the main application requires the image information, the playback apparatus may receive the image information from the mobile device to properly execute the main application. A detailed description is given below.

Figure 5:
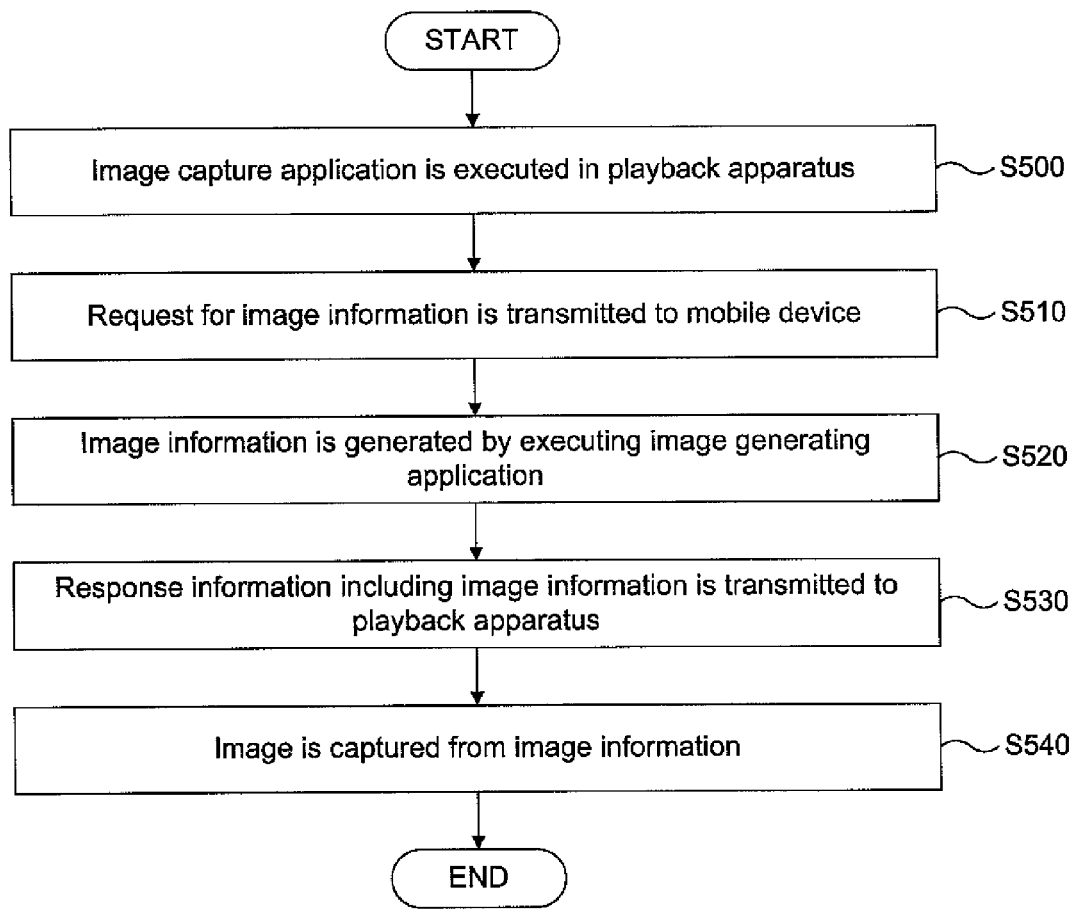
FIG. 5 is a flow diagram illustrating a method for running applications when the auxiliary information includes a request for the image information in accordance with the present invention.

FIG. 5 is a flow diagram illustrating the method for running applications when the auxiliary information includes a request for the image information in accordance with the present invention.

Referring to FIG. 5 the main application is executed in the playback apparatus (S500). The main application may be an image capture application requiring the image information such as a camera input.

When the image information is required during the execution of the image capture application, the auxiliary information, generated by the playback apparatus, including the request for the image information is transmitted to the mobile device (S510).

Thereafter, the image information is generated by executing an image generation application in the mobile device (S520). For instance, when the mobile device is equipped with a camera, the image information is generated by executing the image generation application.

Thereafter, the response information, generated by the mobile device, including the image information obtained from the image generation application is transmitted to the playback apparatus (S530).

Thereafter, the image information included in the response information received from the playback apparatus is relayed to the main application (S540). The image information may be displayed on the screen of the display apparatus connected to the playback apparatus when necessary.

[Fifth Embodiment]

The fifth embodiment exemplifies a method in accordance with the present invention wherein a voice information is demanded during the process of executing the main application.

Generally, the playback apparatus is equipped with a microphone for obtaining the voice information. Therefore, the playback apparatus may not execute the main application properly when the main application requires the voice information. In accordance with the present invention, when the main application requires the voice information, the playback apparatus may receive the voice information from the mobile device to properly execute the main application. A detailed description is given below.

Figure 6:
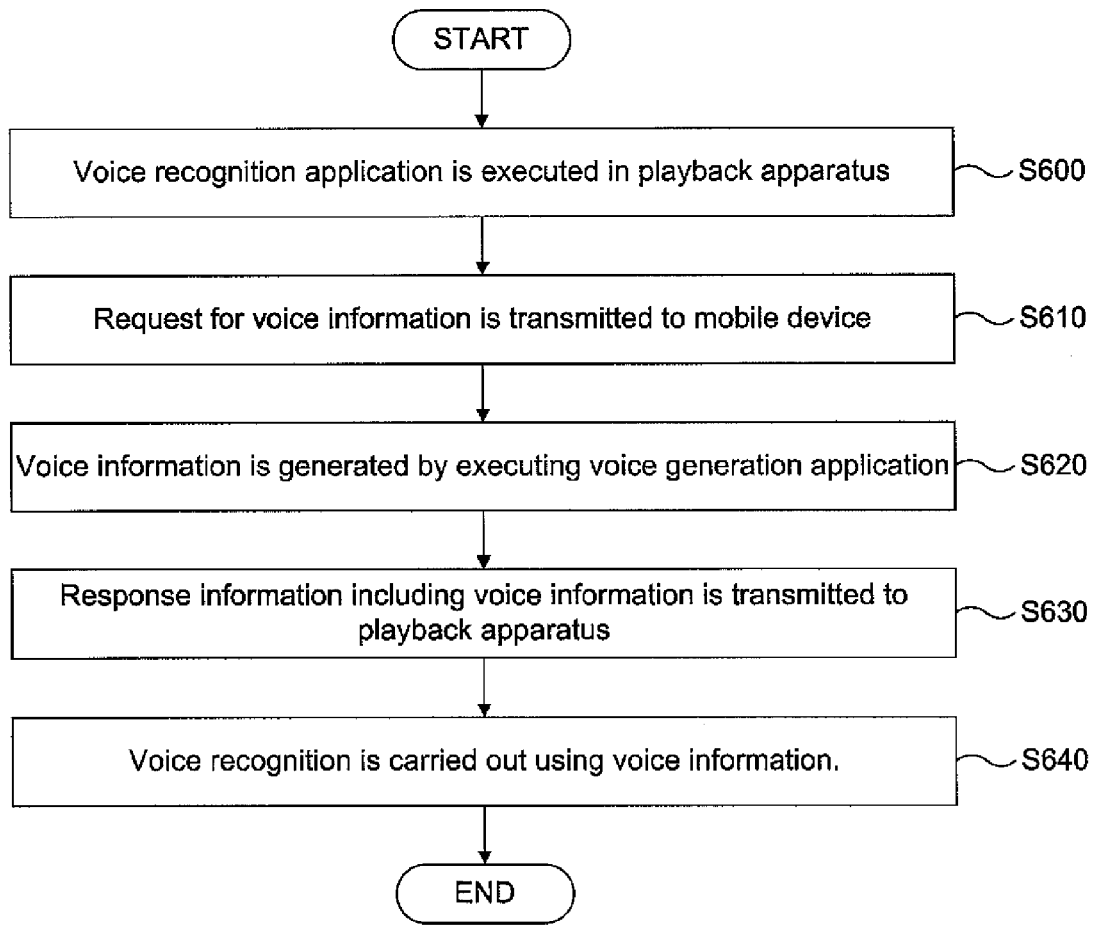
FIG. 6 is a flow diagram illustrating a method for running applications when the auxiliary information includes a request for the voice information in accordance with the present invention.

FIG. 6 is a flow diagram illustrating the method for running applications when the auxiliary information includes a request for the voice information in accordance with the present invention.

Referring to FIG. 6 the main application is executed in the playback apparatus (S600). The main application may be a voice recognition application requiring the voice information such as a microphone input.

When the voice information is required during the execution of the voice recognition application, the auxiliary information, generated by the playback apparatus, including the request for the voice information is transmitted to the mobile device (S610).

Thereafter, the voice information is generated by executing a voice generation application in the mobile device (S620). For instance, when the mobile device is equipped with the microphone, the voice information is generated by executing the voice generation application for receiving the voice information from the user.

Thereafter, the response information, generated by the mobile device, including the voice information generated by the voice generation application is transmitted to the playback apparatus (S630).

Thereafter, the voice information included in the response information received from the playback apparatus is relayed to the main application (S640). A voice recognition is carried out by the voice recognition application using the voice information.

In accordance with the present invention, a function that cannot be provided by the playback apparatus supporting the BD-J specification is provided by the mobile device, thereby preventing the lack of resources and suppressing the rise of the manufacturing costs.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A method for running applications using a mobile device and a playback apparatus, the method comprising steps of:
   (a) executing a main application in the playback apparatus;
   (b) transmitting, by the playback apparatus, to the mobile device an auxiliary information required for running the main application when the auxiliary information is required during the execution of the main application;
   (c) executing an auxiliary application associated with the auxiliary information in the mobile device;
   (d) transmitting a response information obtained in the mobile device by executing the auxiliary application to the playback apparatus; and
   (e) running the main application based on the response information in the playback apparatus,
   wherein the playback apparatus is not capable of providing a GPS (Global Positioning System) function which provides a location information,
   wherein the main application is a map service application requiring the location information, and the auxiliary application is a GPS application,
   wherein the auxiliary information includes a request for the map service application, and the response information includes the location information, and
   wherein the location information is displayed on a screen of a display apparatus connected to the playback apparatus,
   wherein the main application requires a value measured by a compass sensor that is equipped by the mobile device and not equipped by the playback apparatus, wherein the auxiliary information includes a request for the compass sensor-measured value, and wherein the response information includes the compass sensor-measured value.

2. The method in accordance with claim 1, wherein the playback apparatus supports a BD-J (Blu-ray Disc Java) specification.

3. A method of running applications using a playback apparatus, comprising steps of:
   (a) executing a main application by the playback apparatus;
   (b) transmitting, by the playback apparatus, to a mobile device an auxiliary information required for running the main application when the auxiliary information is required during the execution of the main application;
   (c) receiving, by the playback apparatus, from the mobile device a response information obtained by executing an auxiliary application associated with the auxiliary information; and
   (d) running the main application based on the response information by the playback apparatus,
   wherein the playback apparatus is not capable of providing a GPS (Global Positioning System) function which provides a location information,
   wherein the main application is a map service application requiring the location information, and the auxiliary application is a GPS application,
   wherein the auxiliary information includes a request for the map service application, and the response information includes the location information, and
   wherein the location information is displayed on a screen of a display apparatus connected to the playback apparatus,
   wherein the main application requires a value measured by a compass sensor that is equipped by the mobile device and not equipped by the playback apparatus, wherein the auxiliary information includes a request for the compass sensor-measured value, and wherein the response information includes the compass sensor-measured value.

* * * * *